United States Patent Office 2,755,165
Patented July 17, 1956

2,755,165

METHOD FOR THE PREPARATION OF SKELETAL MOUNTS

Marvin I. Lepaw, Brooklyn, N. Y.

No Drawing. Application July 17, 1952,
Serial No. 299,495

3 Claims. (Cl. 8—94.11)

The invention relates to a method for the preparation of skeletal mounts and more particularly, to a procedure for the removal of tissue from bone and includes correlated improvements and discoveries whereby such removal is facilitated. Heretofore, the two most practical methods for the removal of tissue from bone have been the commercial method which involved burying the tissue or body of an animal in dirt containing worms and putrefying bacteria and after a period of about three weeks the bones were exhumed, cleaned, bleached and mounted; and the laboratory method which involved skinning the animal, boiling for a long period in a strong solution of caustic alkali as sodium hydroxide and then removing the tissue from the bones by picking. These methods, however were both time consuming and expensive.

It is an object of the invention to provide a method whereby the forementioned disadvantages are obviated.

A further object of the invention is the provision of a method for the preparation of skeletal mounts in accordance with which tissue is removed from bone in a relatively short period and economically.

A more particular object of the invention is to provide a method whereby skeletal mounts may be prepared by treating tissue containing bone with a solution having a content of free oxygen and free chlorine which may be provided by a suitable hypochlorite.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the invention skeletal mounts are prepared by a method comprising the treatment of embalmed tissue containing bone with a solution having a content of free oxygen and free chlorine. The oxygen and chlorine may be provided by means of a suitably oxygenated chlorine-water and by a suitable hypochlorite which will dissociate in the solution yielding thereto free oxygen and free chlorine, and the hypochlorite may be selected from the group consisting of sodium, potassium and calcium hypochlorites. The embalmed tissue undergoing treatment is desirably maintained in the solution at room temperature and until such time that the tissure is disintegrated and capable of being readily removed from the bone. This period may be upward from about 10 minutes and satisfactory results have been obtained for a period varying from about 10 minutes to about 24 hours.

Furthermore, the oxygen-chlorine solution, e. g., a hypochlorite, may be of a concentration varying from about 2.5% to about 10% and preferably about 5%. The method entails generally and by way of illustration, utilizing an embalmed animal, removing the skin, viscera, eyes and large muscles; placing in a solution of a hypochlorite, as sodium hypochlorite, and permitting it to remain therein at room temperature until the tissue has been oxidized and disintegrated so that it is capable of being readily removed from the bone.

As an illustrative embodiment of a manner in which the invention may be carried out, the following examples are presented.

*Example 1.*—The cranium and mandible of an embalmed cat's head were placed in a 5% solution of sodium hypochlorite. After several minutes, the tissue turned dark brown and bubbles of gas were arising therefrom. After about 15 minutes at room temperature, the remaining tissue had become disintegrated and readily removable. This procedure was repeated several times and in each case, excellent results were obtained.

*Example 2.*—An unembalmed mouse was placed in embalming fluid for three days when it was removed therefrom and then placed in a vessel containing a 5% solution of sodium hypochlorite. The mouse was unskinned. The mouse was left in the solution over night whereupon it was placed in a fresh solution of the same concentration and within 15 minutes the tissue was well disintegrated and capable of ready removal. In order to insure even and thorough disintegration, it was found to be desirable to remove the fur, viscera, eyes and larger muscles.

*Example 3.*—The foreleg of an embalmed rabbit was placed in a solution prepared by dissolving 50 grams of calcium hypochlorite in 800 cc. of water thus giving a concentration of 6.25%. The solution was heated to about 52° C. in order to effect a complete solution of the calcium hypochlorite. After about 20 minutes, the fur, muscles and some tendon had dissolved leaving the bone with some cartilage and some tendon remaining. The remaining cartilage and tendon were disintegrated and capable of ready removal.

*Example 4.*—The foreleg of an embalmed cat was placed in a solution of sodium hypochlorite having a concentration of about 2.5%. The foreleg was permitted to remain in the solution over night with attending disintegration. It was removed from the 2.5% solution and placed in a solution containing 5% of the sodium hypochlorite which effected a rapid disintegration of the skin and muscle and also a disarticulation of the bones.

The foregoing procedures accordingly bring about a disintegration of embalmed tissue thus rendering it capable or ready removal from the bone and thus leading to the preparation of skeletal structures or mounts. If so desired, the skeletal mounts so prepared may be bleached, thus improving their color, by subjecting them to the action of concentrated (30%) hydrogen peroxide.

That like results are not obtained with unembalmed tissue was shown by an experiment in which an axial vertebrum of a cow unembalmed was placed in a 5% solution of sodium hypochlorite and the muscle and all other tissues were still intact after the treatment. Accordingly, there is provided a method for the preparation of skeletal mounts which may be readily carried out since it is neither time consuming nor expensive and this method entails treating embalmed tissue with a solution containing free oxygen and free chlorine, suitably a 5% solution of sodium hypochlorite, for a period which may be from about 10 minutes to about 24 hours whereby the tissue remaining on the bone is either dissolved or disintegrated sufficiently that it may be readily removed. While the solution may be heated, the most satisfactory results have been obtained at room temperature.

Further, it is indicated that the speed of the reaction or treatment becomes slower upon dilution. Moreover, the procedure provides a manner in which embalmed animals following dissection, may be utilized rather than simply discarded.

Since certain changes may be made in carrying out the above method without departing from the scope of the invention, it is intended that all matter contained in the above descripion shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method for the preparation of skeletal mounts which comprises treating embalmed tissue containing bone with a solution having a concentration of about 5% of a hypochlorite selected from the group consisting of sodium, potassium and calcium hypochlorites at room temperature for a period from about 10 minutes to about 24 hours, whereby the tissue is disintegrated and capable of ready removal from the bone.

2. A method for hte preparation of skeletal mounts which comprises treating embalmed tissue containing bone with a solution having a concentration from about 2.5% to about 10% of a hypochlorite selected from the group consisting of sodium, potassium and calcium hypochlorites at room temperature for a period upward from about 10 minutes.

3. A method for the preparation of skeletal mounts which comprises treating embalmed tissue containing bone with a solution having a concentration from about 2.5% to about 10% of a hypochlorite selected from the group consisting of sodium, potassium and calcium hypochlorites at room temperature for a period from about 10 minutes to about 24 hours.

References Cited in the file of this patent

UNITED STATES PATENTS

| | | |
|---|---|---|
| 676,134 | Hunkemoller | June 11, 1901 |
| 1,522,555 | Trotman | Jan. 13, 1925 |

FOREIGN PATENTS

| | | |
|---|---|---|
| 450,350 | Great Britain | July 15, 1936 |

OTHER REFERENCES

Mendelsohn: Mfg. Chem., May 1952; pages 191–193.
Wright: Biochem. Journal, vol. 30, 1936; pages 1661–7.